(12) United States Patent
Rayes et al.

(10) Patent No.: US 12,470,460 B2
(45) Date of Patent: Nov. 11, 2025

(54) COMPUTER NETWORK EMULATION USING NETWORK DEVICE CLUSTERS

(71) Applicant: Cisco Technology, Inc., San Jose, CA (US)

(72) Inventors: Mark Ammar Rayes, Alamo, CA (US); Samer Salam, Beirut (LB); Arman Rezaee, San Francisco, CA (US); Pradeep Kumar Kathail, Los Altos, CA (US); Balaji R Venkatraman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/636,108

(22) Filed: Apr. 15, 2024

(65) Prior Publication Data

US 2025/0323830 A1 Oct. 16, 2025

(51) Int. Cl.
*H04L 41/0866* (2022.01)
*H04L 41/0813* (2022.01)
*H04L 43/50* (2022.01)

(52) U.S. Cl.
CPC ...... *H04L 41/0866* (2013.01); *H04L 41/0813* (2013.01); *H04L 43/50* (2013.01)

(58) Field of Classification Search
CPC .. H04L 41/0866; H04L 41/0813; H04L 43/50
See application file for complete search history.

(56) References Cited

U.S. PATENT DOCUMENTS

| 2020/0012748 A1* | 1/2020 | Ganesan | H04L 41/145 |
| 2022/0094614 A1* | 3/2022 | Khurshid | H04L 41/147 |

(Continued)

FOREIGN PATENT DOCUMENTS

| CN | 115884235 A | 3/2023 |
| CN | 116170314 A | 5/2023 |

(Continued)

OTHER PUBLICATIONS

International Search Report and Written Opinion for International Application No. PCT/US2025/023438, mailed Jul. 11, 2025, 19 Pages.

*Primary Examiner* — Philip C Lee
(74) *Attorney, Agent, or Firm* — Lee & Hayes, P.C.

(57) ABSTRACT

This disclosure describes techniques for emulating the operations of a computer network. In some cases, a method includes receiving first configuration data associated with a first device and second configuration data associated with a second device in a network; determining a first device representation associated with the first device based on the first configuration data and a second device representation associated with the second device based on the second configuration data; determining, based on the first and the second device representations, a first device cluster, wherein the first device cluster comprises a plurality of clustered devices comprising the first device and the second device; determining a first device model associated with the first device cluster, wherein the first device model represents a first device behavior that is common across the plurality of clustered devices; and generating, based on the first device model, an emulation environment associated with the network.

17 Claims, 6 Drawing Sheets (56) References Cited

U.S. PATENT DOCUMENTS

| | | | |
|---|---|---|---|
| 2022/0245462 A1 | 8/2022 | Dechene | |
| 2023/0133057 A1* | 5/2023 | Murthy | G06N 3/04 709/220 |
| 2025/0123913 A1* | 4/2025 | Skogmo | G06F 11/008 |

FOREIGN PATENT DOCUMENTS

| | | |
|---|---|---|
| CN | 116567686 B | 9/2023 |
| WO | 2023193937 A1 | 10/2023 |

* cited by examiner

COMPUTER NETWORK EMULATION USING NETWORK DEVICE CLUSTERS

TECHNICAL FIELD

The present invention relates generally to the field of computer networking and, more specifically, to techniques for modeling and/or emulating computer networks.

BACKGROUND

Network emulation is a valuable tool for designing, testing, and/or troubleshooting complex networks. By creating a virtual model of a network, various scenarios and configurations can be tested without impacting the live network. However, as networks grow in size and complexity, executing accurate and/or efficient network emulations becomes more challenging.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for emulating the operation of a computer network using network device models generated by clustering configuration data representations associated with network devices. In some cases, the techniques relate to a method including receiving, by a processor, first configuration data associated with a first device in a network and second configuration data associated with a second device in the network. The method further includes determining, by the processor, a first device representation associated with the first device based on the first configuration data. The method further includes determining, by the processor, a second device representation associated with the second device based on the second configuration data. The method further includes determining, by the processor and based on the first device representation and the second device representation, a first device cluster, wherein the first device cluster comprises a plurality of clustered devices comprising the first device and the second device. The method further includes determining, by the processor, a first device model associated with the first device cluster, wherein the first device model represents a first device behavior that is common across the plurality of clustered devices. The method further includes generating, by the processor and based on the first device model, an emulation environment associated with the network.

Additionally, the techniques described herein may be performed by a system and/or device having non-transitory computer-readable media storing computer-executable instructions that, when executed by one or more processors, performs the method described above.

Example Embodiments

This disclosure describes techniques for emulating the operations of a computer network using network device models generated by clustering configuration data representations associated with network devices. In some cases, the techniques described herein include: (i) identifying a network with a set of network devices each associated with respective configuration data, (ii) for each network device, determining a device representation based on respective configuration data associated with the network device (e.g., based on block representations associated with configuration blocks in the respective configuration data), (iii) clustering the network devices based on the respective device representations, (iv) for each device cluster, generating a device model that represents a behavior associated with at least one of the network devices in the cluster, and (v) generating a "digital twin network" based on the generated device models.

In some cases, a "digital twin network" is an emulation environment that enables emulating operations associated with a computer network. For example, the digital twin network may be an emulation environment that represents network devices associated with the original production network using emulation nodes. Each emulation node associated with a first network device may interact with emulation node(s) associated with other network device(s) based on the link(s) between the first network device and the other network device(s), as well as based on the device model associated with a device cluster that includes the first network device. Accordingly, in some cases, the digital twin network may mirror at least some aspects of the topology and/or behavior of the original network, but by using a reduced set of device models to represent the various device operations and/or configurations associated with the network devices. This approach may enable efficient emulation and analysis of the network operations without requiring a one-to-one mapping between physical devices and their digital counterparts.

For example, an example network may include network devices D1 and D2 that belong to a first device cluster, network devices D3 and D4 that belong to a second device cluster, and network devices D5 and D6 that belong to a third device cluster. This example network may also include a link between D1 and D2, a link between D1 and D3, a link between D2 and D4, a link between D3 and D5, and a link between D4 and D6. In this example, the corresponding digital twin network may include: (i) a first emulation node corresponding to D1 whose operation is defined based on the D1-D2 link, the D1-D3 link, and a first device model associated with the first device cluster, (ii) a second emulation node corresponding to D2 whose operation is defined based on the D1-D2 link, the D2-D4 link, and the first device model, (iii) a third emulation node corresponding to D3 whose operation is defined based on the D1-D3 link, the D3-D5 link, and a second device model associated with the second device cluster, (iv) a fourth emulation node corresponding to D4 whose operation is defined based on the D2-D4 link, the D4-D6 link, and the second device model, (v) a fifth emulation node corresponding to D5 whose operation is defined based on the D3-D5 link and a third device model associated with the third device cluster, and/or (vi) a sixth emulation node corresponding to D6 whose operation is defined based on the D4-D6 link and the third device model.

As this example illustrates, in some cases, the techniques described herein reduce the computational complexity and/or resource-intensiveness of emulating the operations of a computer network. For example, in some cases, the techniques described herein reduce the computational complexity of network emulation by reducing the number of device models that need to be used for performing network emulation. In the example described above, instead of creating and emulating six different device models (e.g., one for each of D1, D2, D3, D4, D5, and D6), the digital twin network only requires three device models (e.g., one for each device cluster). This reduction in the number of device models can lead to significant computational savings, especially when emulating large-scale networks (e.g., with hundreds or thousands of devices).

Moreover, the techniques described herein can also reduce the storage requirements of network emulation by reducing the number of distinct device models stored on a network emulation system. In some cases, by grouping devices with similar configurations and/or behaviors into clusters and assigning device models to clusters instead of individual devices, the emulation system can execute operations associated with a digital twin network with a fewer number of device models. This may reduce the storage requirements (e.g., memory requirements and/or persistent storage requirements) for performing network emulations. These memory savings may be more significant when emulating the operations of complex networks with complex configuration settings.

Figure 1:
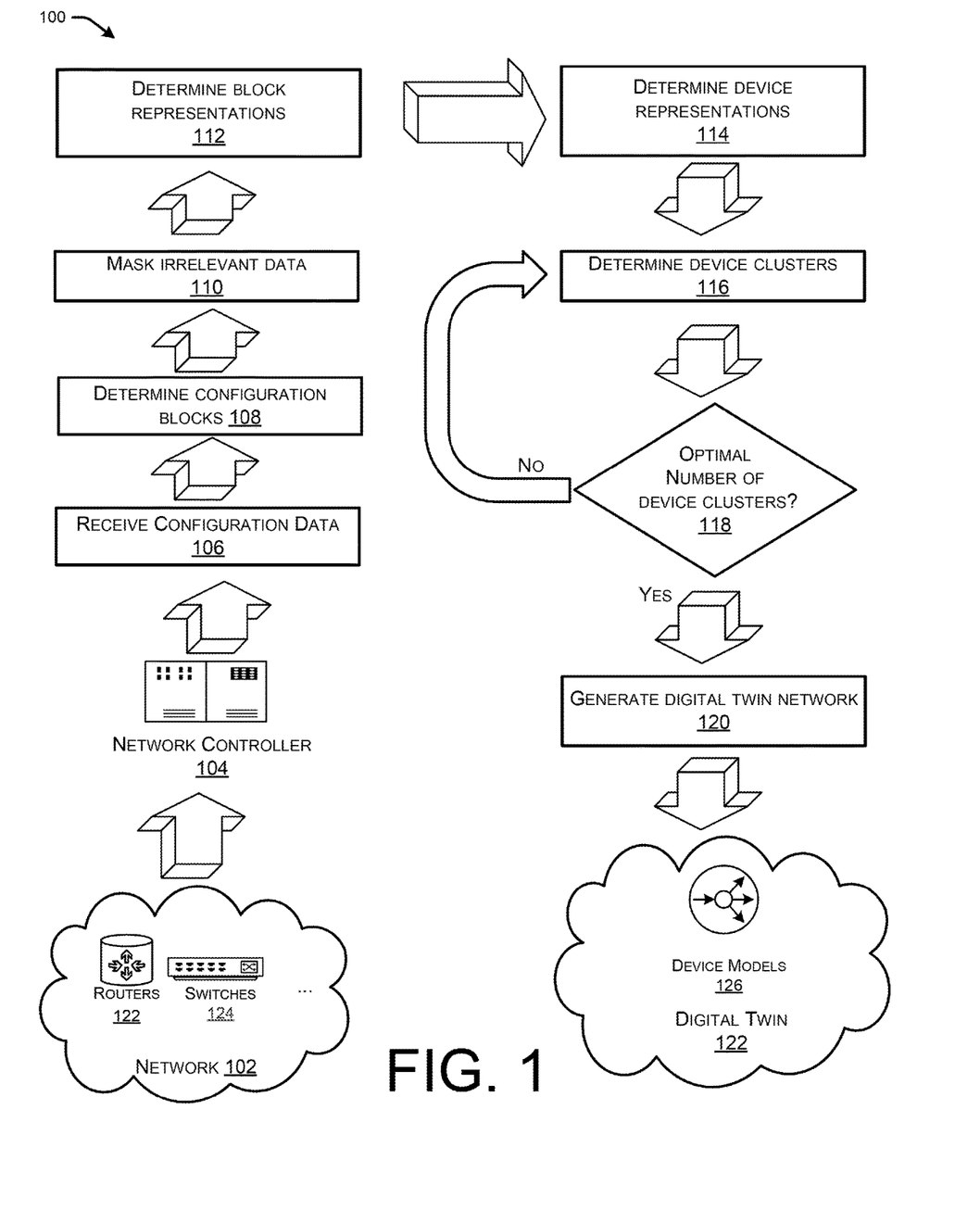
FIG. 1 is a data flow diagram of an example process for generating a digital twin network associated with a computer network.

FIG. 1 is a data flow diagram of an example process 100 for generating a digital twin network 122 associated with a computer network 102. As depicted in FIG. 1, at operation 106, an example system receives configuration data associated with the computer network 102 from a network controller 104 associated with the computer network and/or directly from one or more network devices. The computer network 102 may include a set of network devices, such as one or more routers 124, one or more switches 126, one or more access point devices (e.g., one or more wireless access point devices), one or more firewall devices, one or more load balancer devices, one or more network intrusion detection systems (NIDSs), one or more network intrusion prevention systems (NIPSs), one or more endpoint devices (e.g., personal computer device(s), smart phone device(s), Voice over Internet Protocol (VOIP) phone devices, and/or the like), one or more computer server devices, and/or other types of network devices.

The configuration data received at operation 106 may include, for each network device in the set of network devices, data that defines one or more configurations and/or operations of the network device. For example, the configuration data may include, for a router, data that defines one or more routing tables, one or more access control lists (ACLs), one or more network interface configurations, one or more quality of service (QOS) policies, and/or other types of configurations associated with the operation of the router. As another example, the configuration data may include, for a switch, data that defines one or more virtual local area networks (VLANs), one or more spanning tree protocol (STP) configurations, one or more port configurations, one or more QoS policies, and/or other types of configurations associated with the operation of the switch. As another example, the configuration data may include, for a firewall, data that defines one or more firewall rules, one or more network address translation (NAT) rules, one or more virtual private network (VPN) configurations, and/or other types of configurations associated with the operation of the firewall.

At operation 108, the system determines a set of configuration blocks based on the configuration data received at operation 106. In some cases, given D network devices, the system receives D configuration data sets, each configuration data set associated with a respective one of the D network devices. In some cases, the system divides each of the D configuration datasets into a set of configuration blocks. Accordingly, the system may determine $$B = \sum_{i=1}^{D} B_i$$

configuration blocks, where $B_i$ represents the number of configuration blocks determined based on the ith configuration data set associated with the ith network device.

In some cases, to divide the configuration data associated with a network device into a set of configuration blocks, the system uses the logical structure and/or semantics of the configuration data. In some cases, a configuration block may correspond to a specific aspect of the device's functionality and/or operation, such as to one or more interface settings of the device, one or more security policies (e.g., related to device access control, authentication, and/or encryption) of the device, one or more QoS parameters (e.g., traffic prioritization and/or bandwidth allocation parameters) of the device, one or more routing protocol settings, one or more ACL settings, one or more VLAN settings, and/or the like. For example, the system may divide the configuration data set associated with a router into a first configuration block associated with a routing table, a second configuration block associated with an ACL, a third configuration block associated with a network interface configuration, and/or a fourth configuration block associated with a QoS policy. As another example, the system may divide the configuration data set associated with a switch into a first configuration block associated with VLAN settings, a second configuration block associated with spanning tree protocol (STP) settings, a third configuration block associated with port configurations, and/or a fourth configuration block associated with QoS policies. As yet another example, the system may divide the configuration data set associated with a firewall into a first configuration block associated with firewall rules, a second configuration block associated with NAT settings, a third configuration block associated with VPN configurations, and/or a fourth configuration block associated with intrusion detection and prevention system (IDPS) settings.

In some cases, the system identifies configuration blocks based on keywords, commands, and/or sections in the configuration data that are associated with different aspects of the device's functionality and/or operation. For example, the system may identify an interface configuration block based on the presence of keywords such as "interface," "IP address," "duplex," and/or "speed," which are commonly used to configure network interfaces. Similarly, the system may identify a security policy configuration block based on the presence of keywords such as "access-list," "permit," "deny," and/or "firewall," which are commonly used to define security policies. As another example, the system may identify a VLAN configuration block based on the presence of keywords such as "VLAN," "switchport," and/or "trunk," which are commonly used to configure VLANs on a switch. In some cases, the system uses regular expressions to match and extract specific patterns that correspond to the beginning and end of each configuration block. For example, the system may define a regular expression that matches a VLAN configuration block. This regular expression may match a line that starts with the keyword "VLAN" followed by one or more digits (e.g., representing the VLAN identifier), followed by a newline character, and followed by any number of lines of configuration commands related to that VLAN. As another example, the system may define a regular expression that matches a NAT configuration block. This regular expression may match a line that starts with the keywords "IP NAT" followed by any characters (e.g., representing the specific NAT configuration), followed by a newline character, and followed by any number of lines of related configuration commands.

At operation 110, the system removes and/or masks irrelevant configuration data segments (e.g., tokens). An irrelevant configuration data segment may include one or more tokens of configuration data that is determined to be irrelevant to clustering network devices based on configuration data similarities. Examples of irrelevant configuration data segments may include sets of tokens corresponding to identifiers (e.g., Internet Protocol (IP) addresses), passwords, certificates, and/or other device-specific or sensitive information that does not contribute to identifying similarities in device configurations. For example, consider the following example configuration block: "interface GigabitEthernet0/1; description Connected to Server1; ip address 192.168.1.1 255.255.255.0; ip access-group MY_ACL in; duplex full; speed 1000; no shutdown !". In this example, the IP address "192.168.1.1" and the interface description "Connected to Server1" are specific to this particular network device and may not be relevant for determining configuration similarities across devices.

In some cases, to detect irrelevant configuration data segments, the system may use regular expression(s) to detect specific patterns, such as patterns associated with IP addresses, passwords, and/or certificates. In some cases, to detect irrelevant configuration data segments, the system may use named entity recognition (NER) model(s) to identify and/or label specific types of entities, such as IP addresses, hostnames, and/or usernames. In some cases, to detect irrelevant configuration data segments, the system may use heuristic(s) and/or rule(s) for detecting irrelevant data segments. For example, the system may remove lines that start with specific keywords, such as "IP address," "password," and/or "certificate."

At operation 112, the system determines a block representation for each configuration block. In some cases, to determine the block representation associated with a configuration block, the system processes text data associated with the configuration block using a text encoder machine learning model. The text data may be generated by removing and/or masking any irrelevant configuration data segment(s) from the raw text data associated with the configuration block. Examples of text encoder machine learning models include a Word2 Vec model, a Global Vectors for Word Representation (GloVe) model, a recurrent neural network (RNN) model, and a Long Short Term Memory (LSTM) model, a Gated Recurrent Unit (GRU) model, a transformer-based model (e.g., a Bidirectional Encoder Representations from Transformers (BERT) model, a Generative Pre-trained Transformer (GPT) model, and/or the like).

For example, the configuration block may be associated with the following raw text data: "interface GigabitEthernet0/1; description Connected to Server1; ip address 192.168.1.1 255.255.255.0; ip access-group MY_ACL in; duplex full; speed 1000; no shutdown !". The system may process this text data by removing and/or masking the IP address "192.168.1.1" and the interface description "Connected to Server1." For example, after masking the IP address and the interface description, the processed text data associated with the configuration block may include the following text data: "interface GigabitEthernet0/1; description [Masked_Interface_Description]; ip address [Masked_IP_Address]; ip access-group MY_ACL in; duplex full; speed 1000; no shutdown !". The system may process this text data using a text encoder machine learning model to generate the block representation.

Accordingly, in some cases, after determining B configuration blocks (e.g., where $$B = \sum_{i=1}^{D} B_i$$

configuration blocks, and $B_i$ represents the number of configuration blocks determined based on the ith configuration data set associated with the ith network device), the system determines B text data sets each associated with a respective one of the B configuration blocks. The system then processes the B text data sets associated with the B configuration blocks using a text encoder machine learning model to determine B block representations. In some cases, the system determines the block representations associated with a first set of configuration block types (e.g., routing table blocks) using a first text encoder machine learning model and determines the block representations associated with a second set of configuration block types (e.g., NAT blocks) using a second, different text encoder machine learning model.

At operation 114, the system determines a device representation for each of the network devices based on the block representations associated with the configuration blocks of the network device. In some cases, the network includes D network devices, where each of the D network devices is associated with a configuration data set. In some cases, the system divides the configuration data set associated with the ith network device into $B_i$ configuration blocks. The system then determines a block representation for each of the $B_i$ configuration blocks based on at least a subset of text data associated with the respective configuration block (e.g., text data generated by removing and/or masking irrelevant configuration data segments from the raw text data associated with the respective configuration block). Accordingly, in some cases, the system determines $B_i$ block representations each associated with a respective one of the $B_i$ configuration blocks. In some cases, after the system determines B; block representations associated with the $B_i$ configuration blocks of an ith network device, the system determines a device representation based on the B; block representations. Accordingly, in some cases, the system determines D device representations each associated with a respective one of D network devices.

In some cases, to determine a device representation associated with a network device, the system uses the block representations associated with the network device's configuration blocks. For example, in some cases, the system combines (e.g., concatenates) the block representations associated with the network device's configuration blocks to determine the device representation associated with the network device. As another example, in some cases, the system processes the block representations associated with the network device's configuration blocks using a trained machine learning model (e.g., an ensemble machine learning model) to determine the device representation associated with the network device.

In some cases, to concatenate the block representations associated with a network device, the system uses an ordering associated with a set of defined configuration block types. For example, in some cases, the system may receive data describing a schema of configuration block types and data describing an ordering of the configuration block types in that schema. The system may then concatenate the block representations associated with a network device by storing each block representation in a segment of the device representation that is determined based on the position of the corresponding block type in the defined ordering. In some cases, to the extent a network device does not have a configuration block associated with a particular configuration block type, the system stores a default block representation (e.g., an all-zero representation, such as an all-zero vector) in a segment of the device's representation that is determined based on the position of the particular block type in the defined ordering.

For example, an example schema of configuration block types may include configuration block types T1, T2, T3, and T4. This schema may be associated with the following ordering: T1→T2→T3→T4. Given this example ordering, the device representation associated with a first network device whose configuration data include a block B1 associated with T1 and a block B3 associated with T3 but no configuration blocks associated with T2 or T4, then the device representation associated with this first network device may include a block representation associated with B1, followed by a default (e.g., all zero) block representation associated with T2, followed by a block representation associated with B2, followed by a default (e.g., all zero) block representation associated with T4. As another example, the device representation associated with a second network device whose configuration data include a block B3 associated with T2 and a block B4 associated with T4 but no configuration blocks associated with T1 or T3, then the device representation associated with this first network device may include a block representation associated with B3, followed by a default (e.g., all zero) block representation associated with T1, followed by a block representation associated with B4, followed by a default (e.g., all zero) block representation associated with T3.

At operation 116, the system determines a set of device clusters based on the device representations. The system may process the device representation using a clustering algorithm to determine the device clusters. Examples of clustering algorithms include k-means clustering, hierarchical clustering, density-based spatial clustering of applications with noise (DBSCAN), and a clustering algorithm that uses a measure of similarity of device representations (e.g., a cosine similarity measure). In some cases, the system determines a predefined number of device clusters. In some cases, the system determines a number of device clusters determined based on (e.g., as a ratio of) a number of network devices in the network 102. In some cases, the system iteratively determines the optimal number of clusters by iteratively determining which cluster count achieves a threshold clustering optimality, for example as described below in relation to operation 118.

At operation 118, the system determines whether the number of determined device clusters determined at operation 116 is optimal. For example, after determining a number of device clusters, the system may determine a clustering optimality measure associated with this clustering scheme. If this clustering optimality measure exceeds a threshold, the system determines that the determined number of device clusters is optimal. However, if the clustering optimality measure associated with a clustering scheme fails to exceed the threshold, the system determines that the corresponding number of device clusters is suboptimal.

In some cases, the system determines the clustering optimality score associated with a clustering of the device representations based on a silhouette score associated with a device representation in relation to its determined cluster. The silhouette score may measure a similarity of the device representations to other devices in its cluster. In some cases, the system determines the clustering optimality score based on a summation and/or an average of the silhouette scores associated with all of the device representations associated with the network 102.

In some cases, the system determines the clustering optimality score associated with a clustering of the device representations based on a emulation performance associated with a digital twin network associated with the clustering. In some cases, a digital twin network is associated with a clustering if the number of device models used to generate the digital twin network equals the number of device clusters indicated by the clustering. In some cases, a digital twin network is associated with a clustering if each device model used to generate the digital twin network is associated with a respective one of the device clusters indicated by the clustering.

In some cases, if the system determines that the number of determined device clusters determined at operation 116 is suboptimal (operation 118—No), the system returns to operation 116 to determine a new number of device clusters using a modified number of device clusters. For example, the system may increase the number of desired device clusters by a fixed amount and/or by an amount determined based on the cluster optimality score associated with the previously determined number of clusters.

In some cases, if the system determines that the number of determined device clusters determined at operation 116 is optimal (operation 118—Yes), the system proceeds to operation 120 to generate the digital twin network 122 based on the determined number of device clusters. In some cases, the system determines a device model for each device based on the characteristics, configurations, operations, and/or behaviors of at least a subset of (e.g., a representative one of, a majority of, all of, and/or the like) the network devices in the device cluster.

As depicted in FIG. 1, the digital twin network 122 may include a set of device models each associated with a corresponding device cluster. A device model may define a set of network device operations, configuration settings, state machines, and/or behavioral rules that capture the common characteristics, configurations, and/or operations of at least a subset of (e.g., a representative one of, a majority of, all of, and/or the like) the network devices in a device cluster. In some cases, to determine the device model associated with a device cluster, the system selects one or more representative devices from the network devices in the cluster and determines the device model based on characteristics, configurations, and/or operations of the representative device(s). In some cases, to select a representative device from the network devices associated with a cluster, the system may select the network device whose device representation is closest to the centroid of the device cluster. The centroid of the device cluster may correspond to the average of the device representations of all the devices in the network cluster, and may thus represent the typical device in the cluster. By selecting the device that is closest to the centroid, the system may identify the device that is most representative of the cluster as a whole.

For example, if a device cluster includes a router R1 whose device representation is [0.2, 0.5, 0.1, 0.3], a router R2 whose device representation is [0.3, 0.6, 0.2, 0.4], a router R3 whose device representation is [0.1, 0.4, 0.0, 0.2], and a router R4 whose device representation is [0.4, 0.7, 0.3, 0.5], the system may first determine that the centroid of the device cluster is [0.25, 0.55, 0.15, 0.35]. The system may then compute the Euclidean distance between each device representation and the centroid, and select the device with the minimum distance. In this example, R1 may be selected, because R1's representation has the lowest Euclidean distance with the computed cluster centroid. After R1 is selected as the representative device, the system may determine a device model associated with the cluster based on the characteristics, configurations, and/or operations of R1.

In some cases, to determine the device model associated with a device cluster, the system generates configuration data for a hypothetical device that is associated with characteristics, configurations, and/or operations that are common across the network devices in the device cluster. To generate this hypothetical device, the system may process the characteristics, configurations, and/or operations of all the devices in the cluster, and identify the common elements, patterns, and/or rules across the characteristics, configurations, and/or operations of the clustered network devices. The system may then generate a synthetic device model that incorporates these common elements, patterns, and/or rules, while abstracting away the device-specific elements, patterns, and/or rules. The system may then determine the device model associated with the device cluster based on the characteristics, configurations, and/or operations of this generated synthetic device.

In some cases, to determine the device model associated with a device cluster, the system generates configuration data for a hypothetical device that is associated with any inbound and/or outbound traffic restriction associated with at least one of the network devices in that cluster. For example, the device cluster may include: (i) a firewall F1 that enables inbound Transmission Control Protocol (TCP) traffic on port 80 from 192.168.1.0/24 and on port 443 from 192.168.1.0/24 and allows all outbound traffic, (ii) a firewall F2 that enables inbound TCP traffic on port 80 from 10.0.0.0/16 and on port 22 from 10.0.0.0/16 and allows outbound traffic on ports 80 and 443, and (iii) a firewall F3 that enables inbound TCP traffic on port 443 from 172.16.0.0/12 and allows all outbound traffic. In this example, the hypothetical device may enable inbound TCP traffic on port 80 from 192.168.1.0/24, on port 443 from 192.168.1.0/24, on port 80 from 10.0.0.0/16, on port 22 from 10.0.0.0/16, and on port 443 from 172.16.0.0/12. The hypothetical device may also allow outbound traffic on ports 80 and 443.

In some cases, to determine the device model associated with a device cluster, the system generates configuration data for a hypothetical device that is associated with a protocol (e.g., each routing protocol) used by a threshold number and/or ratio of (e.g., a majority of) the network devices in the device cluster. For example, the device cluster may include: (i) a router R1 that uses Open Shortest Path First (OSPF) and Border Gateway Protocol (BGP) for routing, (ii) a router R2 that uses OSPF and Routing Information Protocol (RIP) for routing, and (iii) a router R3 that uses OSPF for routing. In this example, since a majority of the three routers in the cluster use OSPF for routing, the hypothetical device may be configured to use OSPF for routing.

In some cases, to determine the device model associated with a device cluster, the system generates configuration data for a hypothetical device that is associated with a network interface configuration used by a threshold number and/or ratio of (e.g., a majority of) the network devices in the device cluster. For example, the device cluster may include: (i) a switch S1 that has interfaces configured with spanning-tree portfast, (ii) a switch S2 that has interfaces configured with spanning-tree portfast and storm-control broadcast level 50.00, and (iii) a switch S3 that has interfaces configured with spanning-tree portfast. In this example, since all three switches have interfaces configured with spanning-tree portfast, the hypothetical device may be configured with spanning-tree portfast on its network interface(s).

In some cases, to determine the device model associated with a device cluster, the system generates configuration data for a hypothetical device that is associated with a security policy used by a threshold number and/or ratio of (e.g., a majority of) the network devices in the device cluster. For example, the device cluster may include: (i) a firewall F1 that has a security policy allowing inbound Hypertext Transfer Protocol (HTTP) and Hypertext Transfer Protocol Secure (HTTPS) traffic from a specific subnet and denying all other inbound traffic, (ii) a firewall F2 that has a security policy allowing inbound SSH traffic from a specific subnet and denying all other inbound traffic, and (iii) a firewall F3 that has a security policy allowing inbound HTTP, HTTPS, and Secure Shell (SSH) traffic from a specific subnet and denying all other inbound traffic. In this example, since all three firewalls have a security policy that denies all inbound traffic except for specific allowed traffic from a specific subnet, the hypothetical device may be configured with such a security policy.

In some cases, to determine the device model associated with a device cluster, the system generates configuration data for a hypothetical device that is associated with a QoS policy used by a threshold number and/or ratio of (e.g., a majority of) the network devices in the device cluster. For example, the device cluster may include: (i) a router R1 that has a QoS policy that prioritizes voice traffic over data traffic, (ii) a router R2 that has a QoS policy that prioritizes voice traffic over data traffic and limits data traffic to 50% of the link bandwidth, and (iii) a router R3 that has a QoS policy that prioritizes voice traffic over data traffic. In this example, since all three routers have a QoS policy that prioritizes voice traffic over data traffic, the hypothetical device may be configured with such a QoS policy.

Accordingly, in some cases, given C device clusters, the system generates C device models, each associated with a respective one of the C device clusters and based on characteristics, configurations, and/or operations associated with at least a subset of the network devices in the respective one of the device clusters. In some cases, after generating the C device models, the system generates the emulation environment corresponding to the digital twin network 122 based on the C device models.

In some cases, if the network 102 includes D devices clustered into C device clusters, the digital twin network 122 includes D emulation nodes each associated with a respective one of the D devices and/or configured to perform operation(s) and/or emulate the behavior of the respective one of the D device clusters. In some cases, each emulation node associated with a respective one of the D devices is connected to the emulation node(s) associated with the device node(s) that are connected to the respective device in the network 122. An operational example of generating a digital twin network based on the network topology of an original network and based on device clusters associated with the devices of the original network is described below with reference to FIGS. 2-3.

For example, if the network 102 includes six devices D1-D6 that are clustered into three device clusters C1-C3, where device cluster C1 includes devices D1 and D2, device cluster C2 includes devices D3 and D4, and device cluster C3 includes devices D5 and D6. In this example, the digital twin network 122 may include six emulation nodes EN1-EN6, where: (i) emulation node EN1 is associated with device D1 and configured to emulate the behavior of the device model for the device cluster C1, (ii) emulation node EN2 is associated with device D2 and configured to emulate the behavior of the device model for the device cluster C, (iii) emulation node EN3 is associated with device D3 and configured to emulate the behavior of the device model for the device cluster C2, (iv) emulation node EN4 is associated with device D4 and configured to emulate the behavior of the device model for the device cluster C2, (v) emulation node EN5 is associated with device D5 and configured to emulate the behavior of the device model for the device cluster C3, and (vi) emulation node EN6 is associated with device D6 and configured to emulate the behavior of the device model for the device cluster C3. The connections between the emulation nodes in the digital twin network 122 may mirror the connections between the corresponding devices in the network 102. For example, if device D1 is connected to devices D2 and D3 in the network 102, then emulation node EN1 may be connected to emulation nodes EN2 and EN3 in the digital twin network 122. As another example, if device D4 is connected to devices D2 and D6 in the network 102, then emulation node EN4 may be connected to emulation nodes EN2 and EN6 in the digital twin network 122.

In some cases, by configuring each emulation node in the digital twin network 122 to emulate the behavior of its associated device cluster and connecting the emulation nodes in the same way as their corresponding devices in the network 102, the digital twin network 122 can accurately mimic the structure and behavior of the original network. This approach may enable the system to create a digital twin network that closely resembles the original network, while leveraging the commonalities and similarities between devices in each cluster to reduce the complexity and computational resources required for emulation. The emulation nodes in the digital twin network can be configured with the device models associated with their respective device clusters to enable emulation of the common characteristics, operations, configurations, and/or behaviors of the devices in each cluster.

The digital twin network 122 may be used to emulate the operations, behaviors, characteristics, and/or configurations of the network 102. In some cases, during emulation, the emulation nodes of the digital twin network 122 exchange messages, data, and/or events in the same way as their corresponding devices in the original network 102. This may enable the digital twin network 122 to emulate the end-to-end behavior and performance of the network 122, such as traffic flows, routing decisions, and/or security policies of the network 102. In some cases, the network emulation enabled by the digital twin network 122 may enable: (i) testing and validating network configurations and/or changes before implementing those configurations and/or changes in the production network 102, (ii) troubleshooting and diagnosing network issues by emulating different scenarios and/or conditions, (iii) optimizing network performance by experimenting with different network designs, protocols, and/or policies, (iv) planning network expansion by emulating future network conditions associated with different growth scenarios, and/or (v) training network operators and/or engineers by providing an interactive emulation environment.

Figure 2:
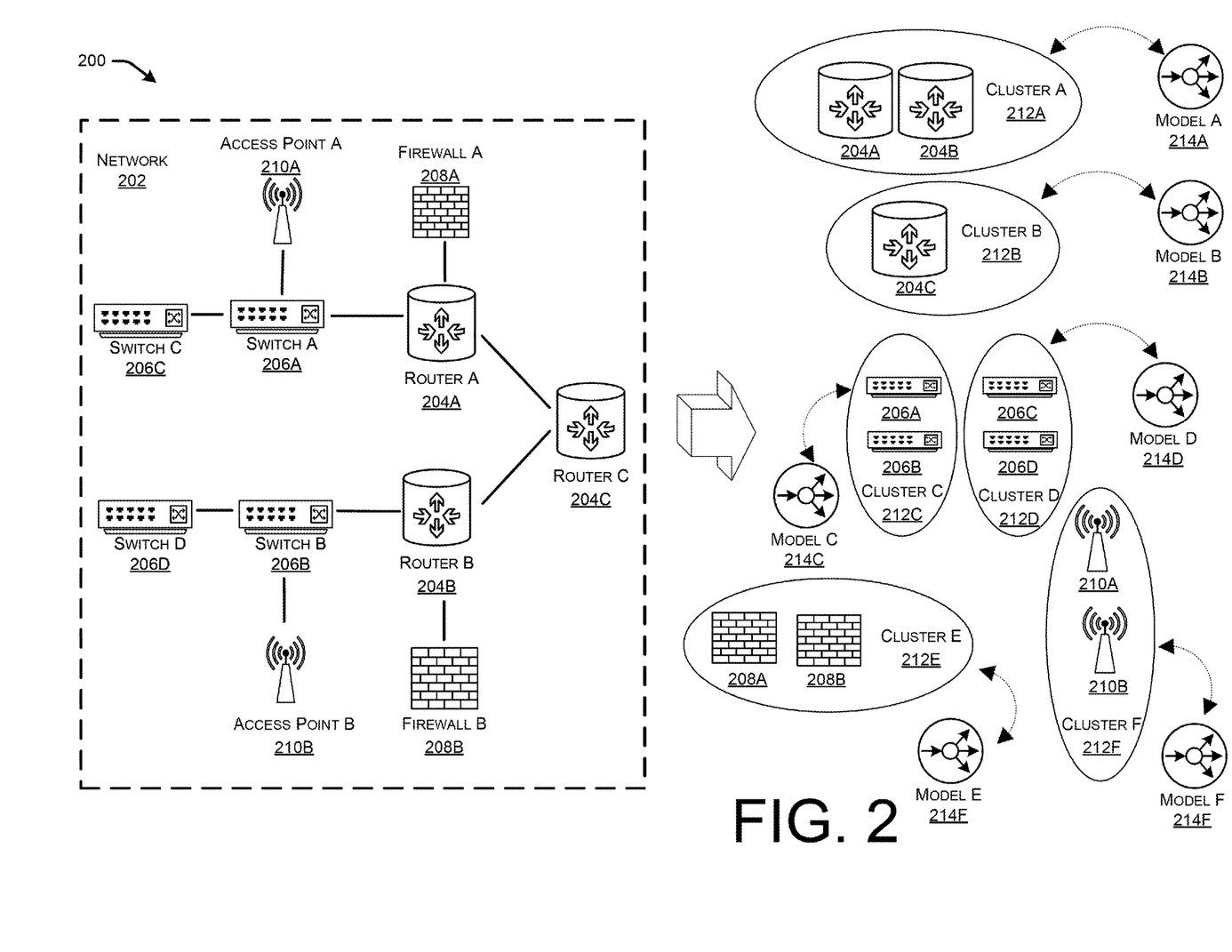
FIG. 2 provides an operational example of generating a set of device models associated with an example network.

FIG. 2 provides an operational example 200 of generating a set of device models associated with an example network 202. As depicted in FIG. 2, the network 202 includes a router A 204A, a router B 204B, and a router C 204C. The router A 204A is connected to the router C 204C, a firewall A 208A, and a switch A; the router B 204B is connected to the router C 204C, a firewall B 208B, and a switch B; and the router C 204C is connected to the router A 204A and the router B 204B. In some cases, at least one of the router A 204A or the router B 204B is a Cisco Aggregation Service Router (ASR) 1001-X. In some cases, the router C 204C is a Cisco ASR 1002-X.

As further depicted in FIG. 2, the network 202 includes a switch A 206A, a switch B 206B, a switch C 206C, and a switch D 206D. The switch A 206A is connected to the router A 204A, the wireless access point A 210A, and the switch C 206C; the switch B 206B is connected to the router B 204B, the wireless access point B 210B, and the switch D 206D; the switch C 206C is connected to the switch A 206A (e.g., and to one or more endpoint devices that are not depicted in FIG. 2); and the switch D 206D is connected to the switch B 206B (e.g., and to one or more endpoint devices that are not depicted in FIG. 2). At least one of the switch A 206A or the switch B 206B may be a Cisco Catalyst 9300 Series switch. At least one of the switch C 206C or the switch D 206D may be a Cisco Catalyst 9200 Series switch.

As further depicted in FIG. 2, the network 202 includes a firewall A 208A that is connected to the router A 204A and a firewall B that is connected to the router B 204B. At least one of the firewall A 208A or the firewall B 208B may be Cisco Adaptive Security Appliances (ASA) 5500-X Series firewall.

As further depicted in FIG. 2, the network 202 includes a wireless access point A 210A that is connected to the switch A 206A or a wireless access point B 210B that is connected to the switch B 206B. At least one of the wireless access point A 210A or the wireless access point B 210B may provide wireless services to one or more endpoint devices. At least one of the wireless access point A 210A or the wireless access point B 210B may be a Cisco Aironet 4800 Series wireless access point.

Given the network 202, an example system may determine a set of device clusters and generate a device model for each of those device clusters. In some cases, the system clusters the devices associated with each device type. For example, as depicted in FIG. 2, the system clusters the routers (i.e., the router A 204A, the router B 204B, and the router C 204C) into two device clusters: a cluster A 212A including the router A 204A and the router B 204B (e.g., which may be the same type of router) and a cluster B 212B including the router C 204C. As another example, the system clusters the switches (i.e., the switch A 206A, the switch B 206B, the switch C 206C, and the switch D 206D) into two device clusters: a cluster C 212C including the switch A 206A and the switch B 206B (e.g., which may be the same type of switch), and a cluster D 212D including the switch C 206C and the switch D 206D (e.g., which may be the same type of switch). As another example, the system clusters the firewalls (i.e., the firewall A 208A and the firewall B 208B) into a single cluster: cluster E 212E that includes the firewall A 208A and the firewall B 208B (e.g., which may be the same type of firewall). As another example, the system clusters the wireless access points (i.e., the access point A 210A and the access point B 210B) into a single cluster: cluster F 212F that includes the access point A 210A and the access point B 210B (e.g., which may be the same type of wireless access point). As described above, the system may cluster a set of network devices (e.g., a set of network devices associated with a device type) using the device representations associated with those network devices.

The system may then generate a device model for each device cluster. For example, as depicted in FIG. 2, the system generates the device model A 214A for the device cluster A 212A, the device model B 214B for the device cluster B 212B, the device model C 214C for the device cluster C 212C, the device model D 214D for the device cluster D 212D, the device model E 214E for the device cluster E 212E, and the device model F 214F for the device cluster F 212F. As described above, the system may generate the device model for a device cluster based on the configurations, operations, and/or characteristics of at least one device in the device cluster. For example, the system may determine the device model A 214A based on the configurations, operations, and/or characteristics of the router A 204A and/or the router B 204B. As another example, the system may determine the device model B 214B based on the configurations, operations, and/or characteristics of the router C 204C. As another example, the system may determine the device model C 214C based on the configurations, operations, and/or characteristics of the switch A 206A and/or the switch B 206B. As another example, the system may determine the device model D 214D based on the configurations, operations, and/or characteristics of the switch C 206C and/or the switch D 206D. As another example, the system may determine the device model E 214E based on the configurations, operations, and/or characteristics of the firewall A 208A and/or the firewall B 208B. As another example, the system may determine the device model F 214F based on the configurations, operations, and/or characteristics of the access point A 210A and/or the access point B 210B.

In some cases, after the system generates the device models based on the determined device clusters, the system uses the device models to generate a digital twin network that emulates the operations of the original network 202. An operational example of generating a digital twin network based on the device clusters determined in FIG. 2 is described below with reference to FIG. 3.

Figure 3:
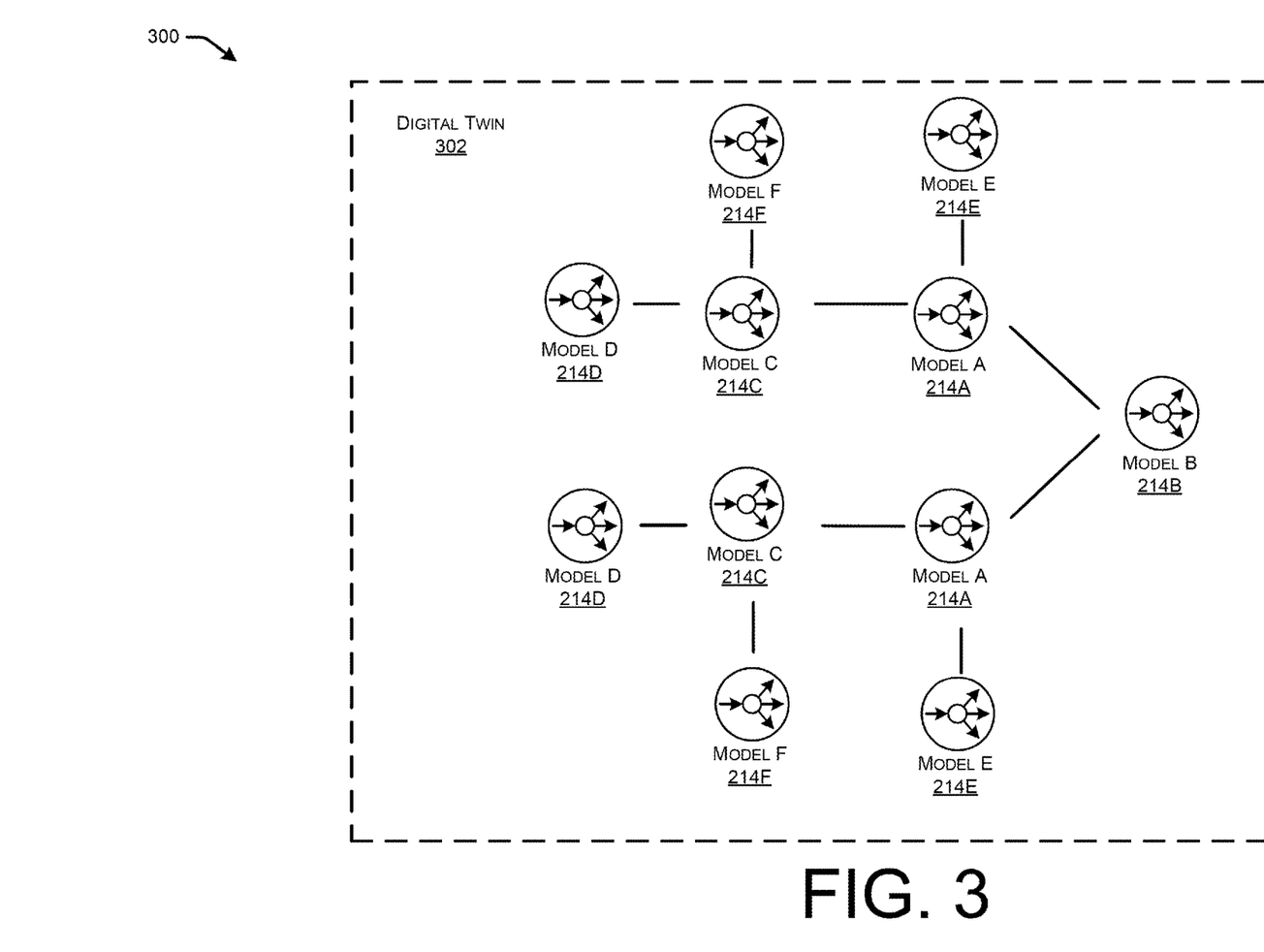
FIG. 3 provides an operational example of generating a digital twin network based on a set of device models.

FIG. 3 provides an operational example 300 of generating a digital twin network 302 based on a set of device models. Specifically, the digital twin network 302 is generated based on the device models generated in FIG. 2.

Accordingly, as depicted in FIG. 3, in the digital twin network 302: (i) the operations and/or configurations of the emulation node corresponding to router A 204A and the emulation node corresponding to router B 204B is determined based on the device model A 214A, (ii) the operations and/or configurations of the emulation node corresponding to router C 204C is determined based on the device model B 21B, (iii) the operations and/or configurations of the emulation node corresponding to switch A 206A and the emulation node corresponding to the switch B 206B is determined based on the device model C 214C, (iv) the operations and/or configurations of the emulation node corresponding to switch C 206C and the emulation node corresponding to switch D 206D is determined based on the device model D 214D, (iv) the operations and/or configurations of the emulation node corresponding to firewall A 208A and the emulation node corresponding to firewall B 208B is determined based on the device model E 214E, and (iv) the operations and/or configurations of the emulation node corresponding to access point A 210A and the emulation node corresponding to access point B 210B is determined based on the device model F 214F.

Figure 4:
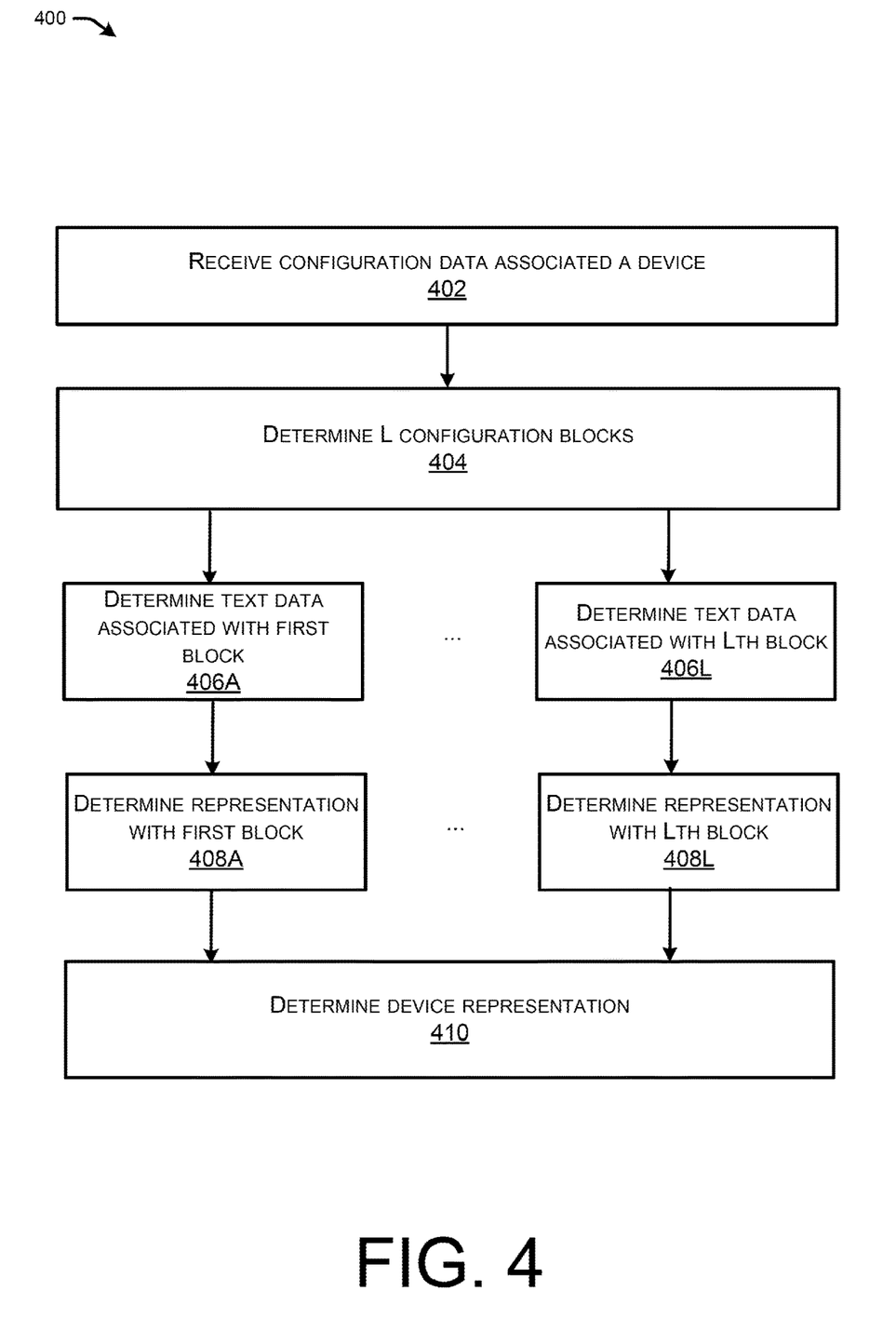
FIG. 4 is a flowchart diagram of an example process for determining a device representation associated with a network device.

FIG. 4 is a flowchart diagram of an example process 400 for determining a device representation associated with a network device. As depicted in FIG. 4, at operation 402, an example system receives configuration data associated with the device. The configuration data may define one or more configurations and/or operations of the network device. For example, the configuration data may define routing tables, ACLs, network interface configurations, QoS policies, VLANs, STP configurations, port configurations, NAT rules, VPN configurations, and/or the like.

At operation 404, the system determines L configuration blocks in the received configuration data. In some cases, to divide the configuration data associated with a network device into a set of configuration blocks, the system uses the logical structure and/or semantics of the configuration data. In some cases, a configuration block may correspond to a specific aspect of the device's functionality and/or operation, such as to one or more interface settings of the device, one or more security policies (e.g., related to device access control, authentication, and/or encryption) of the device, one or more QoS parameters (e.g., traffic prioritization and/or bandwidth allocation parameters) of the device, one or more routing protocol settings, one or more ACL settings, one or more VLAN settings, and/or the like.

Subsequently, the system determines L text data sets. Specifically, the system determines the text data set associated with each of the L configuration blocks. For example, at operation 406A, the system determines the text data associated with a first configuration block, and at operation 406L, the system determines the text data associated with the Lth configuration block. In some cases, to determine the text data associated with a configuration block, the system removes any irrelevant configuration data segments (e.g., tokens) from the raw text data associated with that configuration block. An irrelevant configuration data segment may include one or more tokens of configuration data that is determined to be irrelevant to clustering network devices based on configuration data similarities.

Subsequently, the system determines L block representations, where each block representation is associated with one of the L configuration blocks and determined based on the text data associated with that configuration block. For example, at operation 408A, the system determines the block representation associated with the first configuration block based on the text data associated with the first configuration block, and at operation 408L, the system determines the block representation associated with the Lth configuration block based on the text data associated with the Lth configuration block. In some cases, to determine the block representation associated with a configuration block, the system processes text data associated with the configuration block using a text encoder machine learning model.

At operation 410, the system determines the device representation based on the L block representations associated with the L configuration blocks of the network device. For example, in some cases, the system combines (e.g., concatenates) the block representations associated with the network device's configuration blocks to determine the device representation associated with the network device. As another example, in some cases, the system processes the block representations associated with the network device's configuration blocks using a trained machine learning model (e.g., an ensemble machine learning model) to determine the device representation associated with the network device. In some cases, to concatenate the block representations associated with a network device, the system uses an ordering associated with a set of defined configuration block types.

Figure 5:
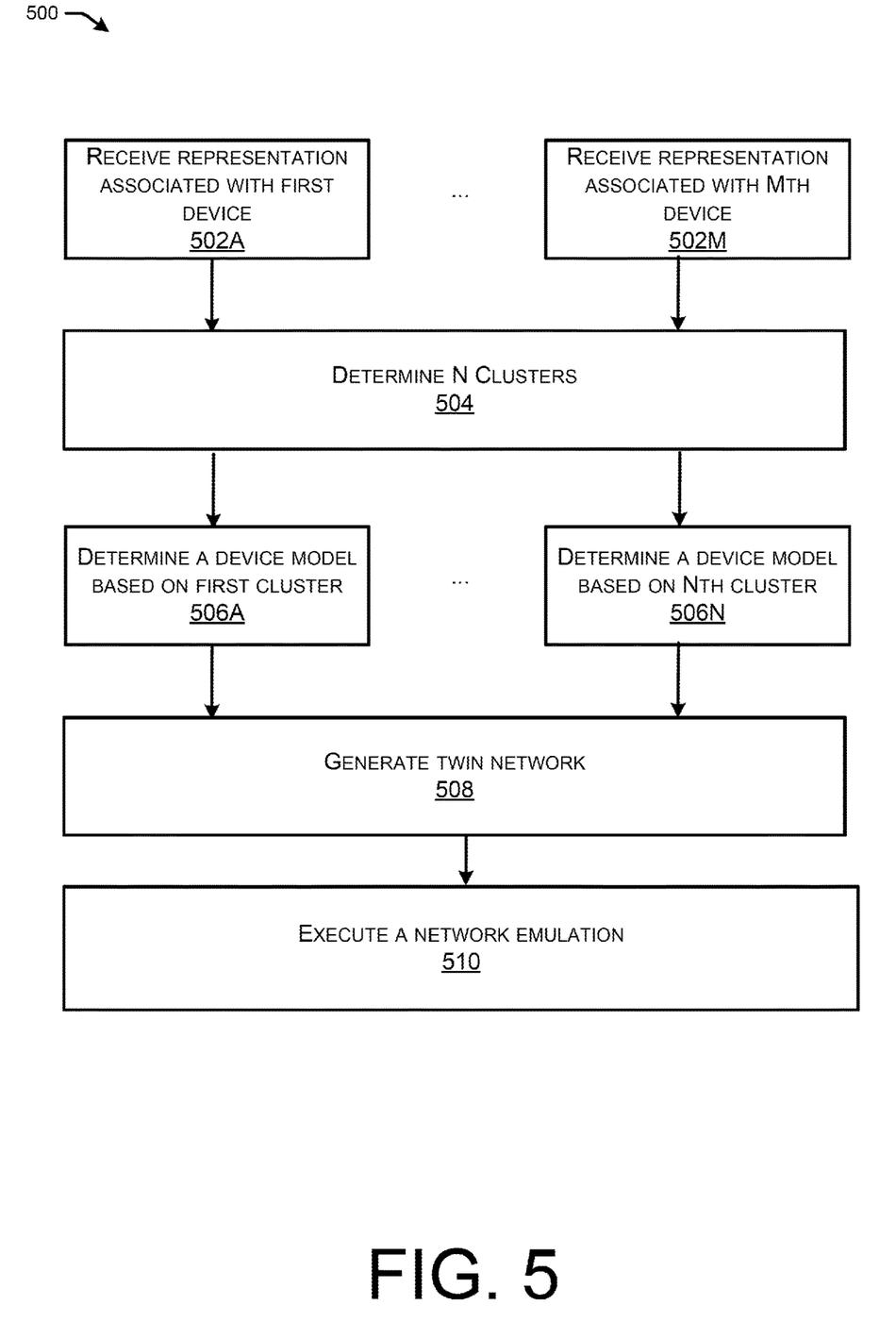
FIG. 5 is a flowchart diagram of an example process for determining a set of device models based on a set of network device representations.

FIG. 5 is a flowchart diagram of an example process 500 for determining a set of device models based on a set of network device representations. The system may first determine M device representations each associated with a respective one of M network devices. For example, the M device representations may correspond to M devices that have the same device type (e.g., M routers, M switches, M firewalls, M access points, M VOIP phones, and/or the like). Accordingly, at operation 502A, the system receives the device representation associated with a first network device, while at operation 502M, the system receives the device representations associated with the Mth network device.

In some cases, the M devices are associated with a common network functionality. The common network functionality may, for example, be associated with at least one of: switching, routing, wireless access, firewalling, load balancing, intrusion detection, intrusion prevention, network optimization, modulating, demodulating, or network interfacing.

At operation 504, the system determines N device clusters based on the M device representations. Each of the N clusters may include a clustered subset of the M device representations and/or the corresponding M network devices. The system may process the device representation using a clustering algorithm to determine the device clusters. Examples of clustering algorithms include k-means clustering, hierarchical clustering, DBSCAN, and a clustering algorithm that uses a measure of similarity of device representations (e.g., a cosine similarity measure).

The system may subsequently determine N device models, each device model being associated with one of the N device clusters and being determined based on at least a subset of the network devices in the respective device cluster. For example, at operation 506A, the system determines a first device model based on a first device cluster, and at operation 506N, the system determines an Nth device model based on an Nth device cluster. A device model may define a set of network device operations, configuration settings, state machines, and/or behavioral rules that capture the common characteristics, configurations, and/or operations of at least a subset of (e.g., a representative one of, a majority of, all of, and/or the like) the network devices in a device cluster. In some cases, to determine the device model associated with a device cluster, the system selects one or more representative devices from the network devices in the cluster and determines the device model based on characteristics, configurations, and/or operations of the representative device(s).

At operation 508, the system generates a digital twin network based on the N device models. In some cases, the system generates M emulation nodes each associated with a respective one of the M network devices. In some cases, the operation and/or configuration of one of the M emulation nodes is determined based on the device model associated with the device cluster to which the corresponding network device belongs.

At operation 510, the system executes a network emulation operation based on the digital twin network. In some cases, during emulation, the emulation nodes of the digital twin network exchange messages, data, and/or events in the same way as their corresponding devices in the original network. This may enable the digital twin network to emulate the end-to-end behavior and performance of the original network. In some cases, the emulation generates emulation output data, such as emulation output data representing a deficiency associated with the network.

Figure 6:
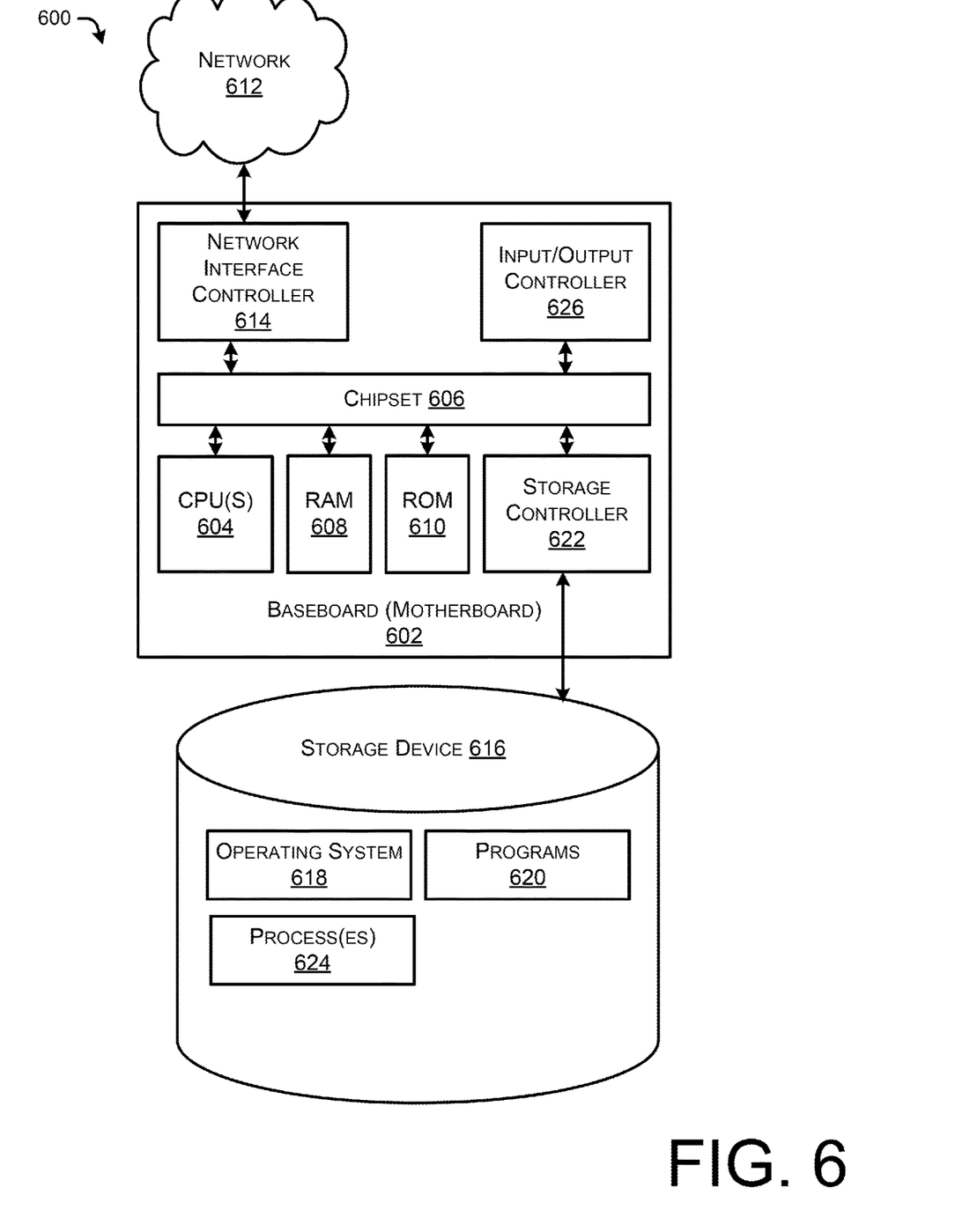
FIG. 6 shows an example computer architecture for a server computer capable of executing program components for implementing the functionality described above.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may, in some examples, correspond to a network node (e.g., the 6) described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 612. The chipset 606 can include functionality for providing network connectivity through a network interface controller (NIC) 614, such as a gigabit Ethernet adapter. The NIC 614 is capable of connecting the computer 600 to other computing devices over the network 612. It should be appreciated that multiple NICs 614 can be present in the computer 600, connecting the computer 600 to other types of networks and remote computer systems. In some instances, the NICs 614 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. The storage device 616 can be connected to the computer 600 through a storage controller 622 connected to the chipset 606. The storage device 616 can consist of one or more physical storage units. The storage device 616 may have a controller to interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the mass storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computers 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 616 stores programs 620, which may include one or more processes 624. The process(es) 624 may include instructions that, when executed by the CPU(s) 604, cause the computer 600 and/or the CPU(s) 604 to perform one or more operations, such as operations described above with regard to FIGS. 1-5.

The computer 600 can also include at least one input/output controller 626 for receiving and processing input from a number of input devices, such as a keyboard, a mouse, a touchpad, a touch screen, an electronic stylus, or other type of input device. Similarly, an input/output controller 626 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving, by a processor, first configuration data associated with a first device in a network and second configuration data associated with a second device in the network;
    determining, by the processor, a first device representation associated with the first device based on the first configuration data, wherein determining the first device representation comprises:
        determining a first configuration block and a second configuration block based on the first configuration data;
        determining, based on first text data associated with the first configuration block, a first block representation;
        determining, based on second text data associated with the second configuration block, a second block representation; and
        determining the first device representation based on the first block representation and the second block representation;
    determining, by the processor, a second device representation associated with the second device based on the second configuration data;
    determining, by the processor and based on the first device representation and the second device representation, a first device cluster, wherein the first device cluster comprises a plurality of clustered devices comprising the first device and the second device;
    determining, by the processor, a first device model associated with the first device cluster, wherein the first device model represents a first device behavior that is common across the plurality of clustered devices; and
    generating, by the processor and based on the first device model, an emulation environment associated with the network.

2. The method of claim 1, wherein generating the emulation environment comprises:
    generating an emulated device controller based on the first device model;
    generating a first emulated device node associated with the first device and a second emulated device node associated with the second device;
    controlling the first emulated device node based on the emulated device controller and one or more first network connections of the first device; and
    controlling the second emulated device node based on the emulated device controller and one or more second network connections of the second device.

3. The method of claim 1, wherein determining the first block representation comprises:
    processing the first text data using a text encoder machine learning model.

4. The method of claim 1, wherein determining the first block representation comprises:
    removing at least one of an identifier or a password from the first configuration block to generate a third configuration block; and
    determining the first block representation based on the third configuration block.

5. The method of claim 1, wherein determining the first device representation based on the first block representation and the second block representation comprises concatenating the first block representation and the second block representation.

6. The method of claim 1, wherein the first configuration block is associated with a first network protocol and the second configuration block is associated with a second network protocol.

7. The method of claim 1, further comprising:
    emulating, by the processor and using the emulation environment, operation of the network to generate emulation output data representing emulated performance of the network; and
    determining, by the processor, whether the emulation output data represents a deficiency associated with the network.

8. The method of claim 1, wherein determining the first device cluster comprises:
    clustering a set of device representations associated with a set of devices, wherein the set of devices comprise the first device, the second device, and a third device, and wherein the set of devices are associated with a common network functionality.

9. The method of claim 8, wherein the common network functionality is associated with at least one of:
    switching,
    routing,
    wireless access,
    firewalling,
    load balancing,
    intrusion detection,
    intrusion prevention,
    network optimization,
    modulating,
    demodulating, or
    network interfacing.

10. A system comprising:
    one or more processors; and
    one or more computer-readable media storing computer-executable instructions that, when executed by the one or more processors, cause the one or more processors to perform operations comprising:
        receiving first configuration data associated with a first device in a network and second configuration data associated with a second device in the network;
        determining a first device representation associated with the first device based on the first configuration data, wherein determining the first device representation comprises:
            determining a first configuration block and a second configuration block based on the first configuration data;

determining, based on first text data associated with the first configuration block, a first block representation;

determining, based on second text data associated with the second configuration block, a second block representation; and determining the first device representation based on the first block representation and the second block representation;

determining a second device representation associated with the second device based on the second configuration data;

determining, based on the first device representation and the second device representation, a first device cluster, wherein the first device cluster comprises a plurality of clustered devices comprising the first device and the second device;

determining a first device model associated with the first device cluster, wherein the first device model represents a first device behavior that is common across the plurality of clustered devices; and generating, based on the first device model, an emulation environment associated with the network.

11. The system of claim 10, wherein generating the emulation environment comprises:

generating an emulated device controller based on the first device model;

generating a first emulated device node associated with the first device and a second emulated device node associated with the second device;

controlling the first emulated device node based on the emulated device controller and one or more first network connections of the first device; and controlling the second emulated device node based on the emulated device controller and one or more second network connections of the second device.

12. The system of claim 10, wherein determining the first block representation comprises:

processing the first text data using a text encoder machine learning model.

13. The system of claim 10, wherein determining the first block representation comprises:

removing at least one of an identifier or a password from the first configuration block to generate a third configuration block; and determining the first block representation based on the third configuration block.

14. One or more non-transitory computer-readable media storing computer-executable instructions that, when executed by one or more processors, cause the one or more processors to perform operations comprising:

receiving first configuration data associated with a first device in a network and second configuration data associated with a second device in the network;

determining a first device representation associated with the first device based on the first configuration data, wherein determining the first device representation comprises:

determining a first configuration block and a second configuration block based on the first configuration data;

determining, based on first text data associated with the first configuration block, a first block representation;

determining, based on second text data associated with the second configuration block, a second block representation; and determining the first device representation based on the first block representation and the second block representation;

determining a second device representation associated with the second device based on the second configuration data;

determining, based on the first device representation and the second device representation, a first device cluster, wherein the first device cluster comprises a plurality of clustered devices comprising the first device and the second device;

determining a first device model associated with the first device cluster, wherein the first device model represents a first device behavior that is common across the plurality of clustered devices; and generating, based on the first device model, an emulation environment associated with the network.

15. The one or more non-transitory computer-readable media of claim 14, wherein generating the emulation environment comprises:

generating an emulated device controller based on the first device model;

generating a first emulated device node associated with the first device and a second emulated device node associated with the second device;

controlling the first emulated device node based on the emulated device controller and one or more first network connections of the first device; and controlling the second emulated device node based on the emulated device controller and one or more second network connections of the second device.

16. The one or more non-transitory computer-readable media of claim 14, wherein determining the first block representation comprises:

processing the first text data using a text encoder machine learning model.

17. The one or more non-transitory computer-readable media of claim 14, wherein determining the first block representation comprises:

removing at least one of an identifier or a password from the first configuration block to generate a third configuration block; and determining the first block representation based on the third configuration block.

* * * * *